US008284766B2

(12) United States Patent
Anders et al.

(10) Patent No.: US 8,284,766 B2
(45) Date of Patent: Oct. 9, 2012

(54) MULTI-CORE PROCESSOR AND METHOD OF COMMUNICATING ACROSS A DIE

(75) Inventors: Mark Anders, Hillsboro, OR (US); Himanshu Kaul, Portland, OR (US); Ram Krishnamurthy, Portland, OR (US); Shekhar Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1319 days.

(21) Appl. No.: 11/966,327

(22) Filed: Dec. 28, 2007

(65) Prior Publication Data

US 2009/0168767 A1    Jul. 2, 2009

(51) Int. Cl.
*H04L 12/66* (2006.01)
(52) U.S. Cl. .................. 370/354; 370/355; 370/356
(58) Field of Classification Search .......... 370/352–356
See application file for complete search history.

(56) References Cited

U.S. PATENT DOCUMENTS

| 2006/0270447 | A1* | 11/2006 | Everson et al. ............ 455/552.1 |
| 2008/0002636 | A1* | 1/2008 | Gaur et al. .................... 370/338 |
| 2012/0033661 | A1* | 2/2012 | Knappe ........................ 370/352 |

OTHER PUBLICATIONS

Chi, A Switch Supporting Circuit and Packet Switching for On-Chip Networks, IEEE, 2006.*
William J. Dally et al., "Route Packets, Not Wires: On-Chip Interconnection Networks," DAC 2001, Jun. 18-22, 2001, Las Vegas, Nevada.
Kuei-Chung Chang et al., "Evaluation and Design Trade-Offs Between Circuit-Switched and Packet-Switched NOCs for Application-Specific SOCs," DAC 2006, Jul. 24-28, 2006, San Francisco, CA,pp. 143-148.
Hsin-Chou Chi et al., "An Efficient Scheduler for Circuit-Switched Network-on-Chip Architectures," 2006 IFIP, pp. 68-73.

* cited by examiner

*Primary Examiner* — Ronald Abelson
(74) *Attorney, Agent, or Firm* — KED & Associates, LLP

(57) ABSTRACT

A multi-core die is provided that allows packets to be communicated across the die using resources of a packet switched network and a circuit switched network.

20 Claims, 4 Drawing Sheets

MULTI-CORE PROCESSOR AND METHOD OF COMMUNICATING ACROSS A DIE

BACKGROUND

1. Field

Embodiments of the present invention may relate to a multi-core processor.

2. Background

A multi-core processor may include two or more independent cores in a single package composed of a single integrated circuit (IC), called die, or more dies packaged together. For example, a dual-processor may contain two cores and a quad-processor may contain four cores. The multi-core processor may implement multiprocessing in a single physical package. A processor with all cores on a single die may be called a monolithic processor.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may include an on-chip hybrid interconnect network system for a multi-core die to manage a power budget.

Figure 1:
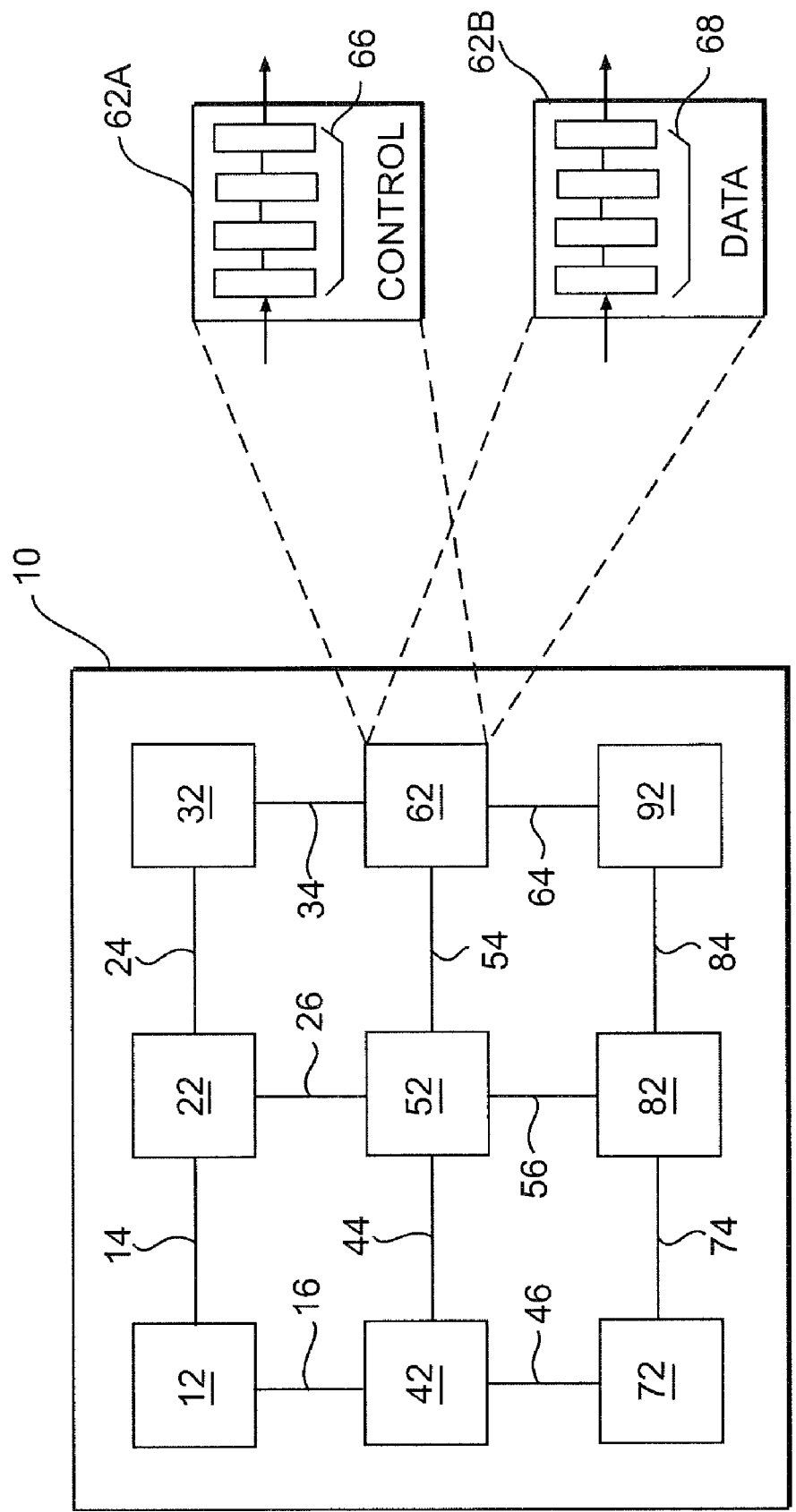
FIG. 1 shows a die having a plurality of cores that operate as a packet-switched network providing intra-die communication in accordance with an example arrangement.

FIG. 1 shows a die having a plurality of cores that operate as a packet-switched network providing intra-die communication in accordance with an example arrangement. Other arrangements may also be used.

More specifically, FIG. 1 shows a die 10 that includes a plurality of cores 12, 22, 32, 42, 52, 62, 72, 82 and 92 mounted thereon. The die 10 is therefore considered to be a multi-core die. The die 10 shows the multi-cores organized or arranged as a grid, although the cores may be organized or arranged differently. The cores may be provided in a network or communicate in a network, such as a packet switched network, of the die 10.

The cores 12, 22, 32, 42, 52, 62, 72, 82 and 92 may be coupled together by interconnects 14, 16, 24, 26, 34, 44, 46, 54, 56, 64, 74 and 84. More specifically, the core 12 may be coupled to the core 22 by the interconnect 14, and the core 12 may be coupled to the core 42 by the interconnect 16. The core 22 may be coupled to the core 32 by the interconnect 24, and the core 22 may be couple to the core 52 by the interconnect 26. Still further, the core 32 may be coupled to the core 62 by the interconnect 34.

The core 42 may be coupled to the core 52 by the interconnect 44, and the core 42 may be coupled to the core 72 by the interconnect 46. The core 52 may be coupled to the core 62 by the interconnect 54, and the core 52 may be coupled to the core 82 by the interconnect 56. Still further, the core 62 may be coupled to the core 92 by the interconnect 64. The core 72 may also be coupled to the core 82 by the interconnect 74, and the core 82 may be coupled to the core 92 by the interconnect 84.

In FIG. 1, packets may be communicated among the various cores using resources of the packet switched network. That is, the packet switched network may provide communication between the cores. The packets may include a control portion and a data portion. The control portion may include a destination address of the packet, and the data portion may contain the specific data to be communicated on the die 10. For example, the control portion may include a destination address that corresponds to one of the cores of the die. The packet switched network may include buffering because a dedicated path is not assured from a source to a destination and so a packet may need to be stopped temporarily if two or more packets need to traverse a same link or interconnect.

In a packet switched network, the packets may be buffered at each of the respective cores as the packet travels from a source to a destination. The packets may be received, transmitted and processed in a router (not shown) of each core. For example, FIG. 1 shows two components of a router within the core 62, namely a control portion component 62A and a data portion component 62B. Although, the components 62A and 62B are shown as separate elements of the router, the components 62A and 62B may be provided as one component.

The control portion component 62A may include a plurality of flip-flops 66 coupled in series to buffer the control portion of a packet as the packet passes through the router of the core. The first one of the flip-flops 66 may receive the control portion of the packet from another router located at another core, and the last one of the flip-flops 66 of one router may provide the control portion of the packet to another router (on another core).

The data portion component 62B may include a plurality of flip-flops 68 coupled in series to buffer the data portion of a packet as the packet passes through the router. The first one of the flip-flops 68 may receive the data portion of the packet from another router located at another core, and the last one of the flip-flops 68 of the router may provide the data portion of the packet to another router (on another one of the cores).

The packet switched network may buffer packets at each of the cores using the flip-flops 66 and 68 in the components 62A and 62B. The packet switched network may use point-to-point communication between neighboring cores. The control portions of the packets may be transferred between cores based on a packet clock, such as a 4 GHz clock. The data portion of the packets may be transferred between cores based on a similar clock, such as a 4 GHz clock. While packet switching offers flexibility in routing, packet switching may suffer from large power consumption associated with a necessity to buffer packets at each core.

Figure 2:
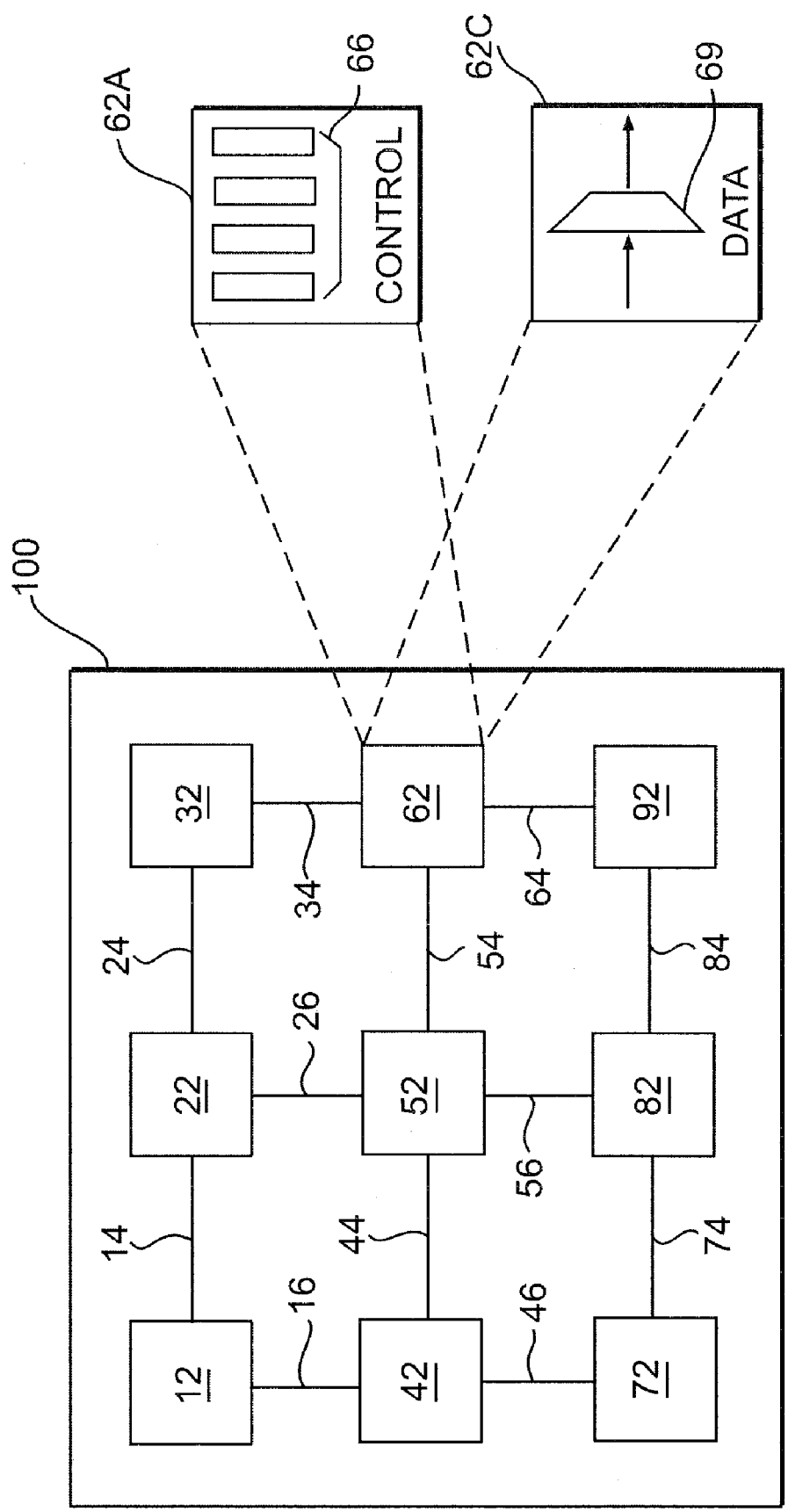
FIG. 2 shows a die having a plurality of cores that operate as a packet switched network and a circuit switched network in accordance with an example embodiment of the present invention.

FIG. 2 shows a die having a plurality of cores that operate as a packet switched network and a circuit switched network in accordance with an example embodiment of the present invention. Other embodiments and configurations are also within the scope of the present invention.

More specifically, FIG. 2 shows a die 100 that includes the plurality of cores 12, 22, 32, 42, 52, 62, 72, 82 and 92 mounted thereon, and the plurality of interconnects 14, 16, 24, 26, 34, 44, 46, 54, 56, 64, 74 and 84. For ease of illustration, the cores and the interconnects may be arranged and coupled on the die 100 in a similar manner as the die 10 in FIG. 1. The die 100 may therefore be considered a multi-core die. The cores may be provided in two networks or communicate in two networks, such as a packet switched network and a circuit switched network, of the die 100. Although not shown in FIG. 2, a router may be provided within each of the cores 12, 22, 32, 42, 52, 62, 72, 82 and 92.

In FIG. 2, packets may be communicated among the various cores using resources of the packet switched network and using resources of the circuit switched network.

FIG. 2 shows two components of a router of the core 62, namely a control portion component 62A and a data portion component 62C. Although not shown in FIG. 2, the router may also include the data portion component 62B shown in FIG. 1 since resources within the component 62B may be considered resources of the packet switched network. FIG. 2 shows the components 62A and 62C as separate elements of the router, although the components 62A and 62C may be provided as one component.

The control portion component 62A may include the plurality of flip-flops 66 coupled in series to buffer the control portion of a packet as the packet passes through the router. In a similar manner as discussed above, the first one of the flip-flops 66 may receive the control portion of the packet from another router (on another one of the cores), and the last one of the flip-flops 66 may provide the control portion of the packet to another router (on another core).

The data portion component 62C may include a multiplexer 68 to receive the data portion of packets from neighboring cores, and to provide the data portion to another neighboring core. As such, the data portion component 62C may not utilize the flip-flops 66 (from the packet switch network). The circuit switched network may therefore avoid buffering data packets at each of the cores. Both the packet switched network and the circuit switched network may use multiplexers.

The die 100 may communicate among the cores using resources of the packet switched network and using resources of the circuit switched network. For example, a control portion of a packet may be sent from a source core to a destination core without simultaneously sending the corresponding data portion of the packet. The sending of the control portion of a packet may utilize resources of the packet switched network. Upon the control portion being received at the destination core, an acknowledgement signal (or message) may be sent from the destination core to the source core by utilizing resources of the circuit switched network. The source core may then send the data portion of the packet from the source core to the destination core by utilizing resources of the circuit switched network.

Because the die 100 utilizes resources of two networks, different clock speeds may be used, which leads to less power consumption. For example, control portions of the packets may be transferred between cores of the die 100 based on a packet clock, such as a 4 GHz clock, which corresponds to a packet switch clock. The data portion of the packets may be transferred between cores of the die 100 based on a different and slower clock, such as a 1 GHz clock, which corresponds to a circuit switch clock.

As each control portion (or request) passes each core/interconnect segment, the corresponding data channel for that segment (i.e., the corresponding interconnect) may be allocated for the upcoming data portion of the packet. Therefore, when the control portion reaches the destination, a complete channel or circuit may have been established for the upcoming data portion of the packet. This channel may utilize a latching or storage element only at the destination with multiplexers and repeaters (not shown explicitly) at each core (or node) along the way.

The destination core, upon receiving the control portion, may send a single acknowledgement signal (or message) back to the source, thereby indicating that the destination is ready to receive the data. When the source receives this acknowledgement signal, the source may drive the data onto its output. The data may propagate from the source to the destination without interruption by state elements along the path.

Different clocks may be used to synchronize the packet switched network and the circuit switched network. Since each portion of the packet travels only between neighboring cores during each cycle, the die 100 may operate with a higher frequency clock (packet clock) when utilizing resources of the packet switched network than the circuit switched network (data clock), where data travels across the whole network each cycle.

In order to transmit a single data packet, the circuit switched network allocates an entire path whereas the packet switched network allocates only a single segment (or interconnect). This results in difference in throughput. To compensate for this difference in throughput, a data bit width of the circuit switched network may be increased to result in equal throughput.

The die 100 that utilizes both the packet switched network and the circuit switched network may not utilize nearly all state elements when using resources of the circuit switched network by latching the data only at the final destination. In the packet switched network, most of the power consumed by clocked state elements which may be used for packet staging.

Figure 3:
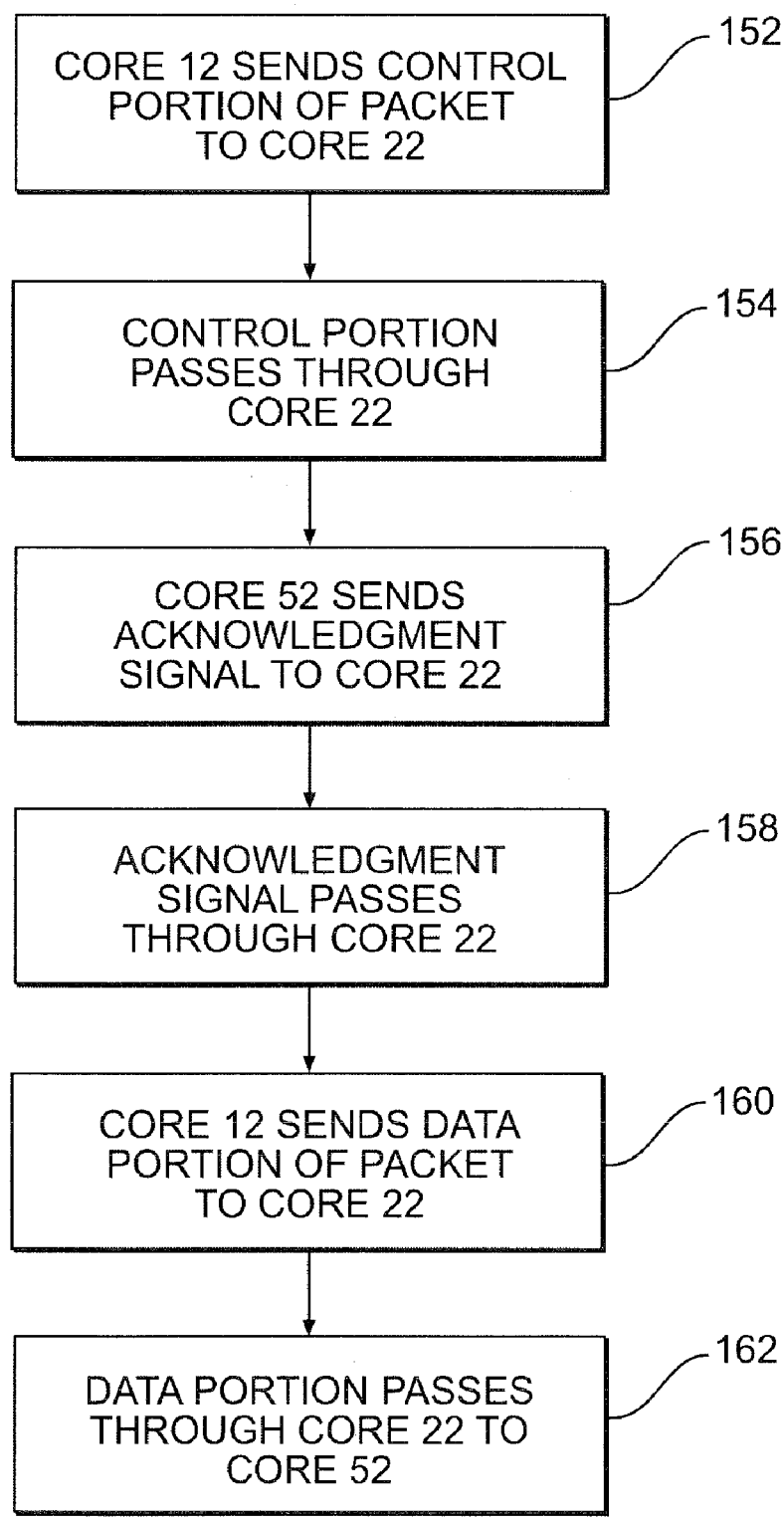
FIG. 3 is a flowchart of a method of communicating data on a multi-core die according to an example embodiment of the present invention.

FIG. 3 is a flowchart of a method of communicating data on a multi-core die according to an example embodiment of the present invention. Other operations, orders of operations and embodiments are also within the scope of the present invention.

More specifically, FIG. 3 shows operations associated with sending data from a source core to a destination core by utilizing resources of both the packet switched network and the circuit switched network. As an example, FIG. 3 describes the sending of data from core 12 (i.e., the source) to the core 52 (i.e., the destination). Other examples are also within the scope of the present invention.

In operation 152, the core 12 may send a control portion of a packet across the interconnect 14 to the core 22. In operation 154, the control portion of the packet may pass through the core 22 and pass across the interconnect 26 to the core 52 (i.e., the destination).

In response to the core 52 (i.e., the destination) receiving the control portion, the core 52 may send an acknowledgment signal (or message) across the interconnect 26 to the core 22 in operation 156. The acknowledgement signal may pass through the core 52 and pass across the interconnect 14 to the core 12 in the operation 158.

In response to the core 12 (i.e., the source) receiving the acknowledgement signal, the core 12 sends a data portion of the packet across the interconnect 14 to the core 22 in operation 160. The data portion pass through the core 22 and passes across the interconnect 26 to the core 52 in operation 162.

In communicating across the multi-core die, each packet may require three traversals of signals. These signal traversals may be referred to as a first pipelined stage, a second pipelined stage and a third pipelined stage.

The first stage may involve traversal of a control portion (of a packet) from the source to the destination. The second stage may involve traversal of an acknowledgement signal (or message) back to the source from the destination to indicate that the data can be sent from the source. The third stage may involve the sending of a data portion (of the packet) to the destination from the source.

The first, second and third pipelined stages may be pipelined to improve the network throughput such that request packets allocate an acknowledgement channel for a next data clock cycle. The data channel may be allocated during the data clock cycle following the receipt of the acknowledge signal. The three pipeline stages of a router are illustrated in FIG. 4.

Figure 4:
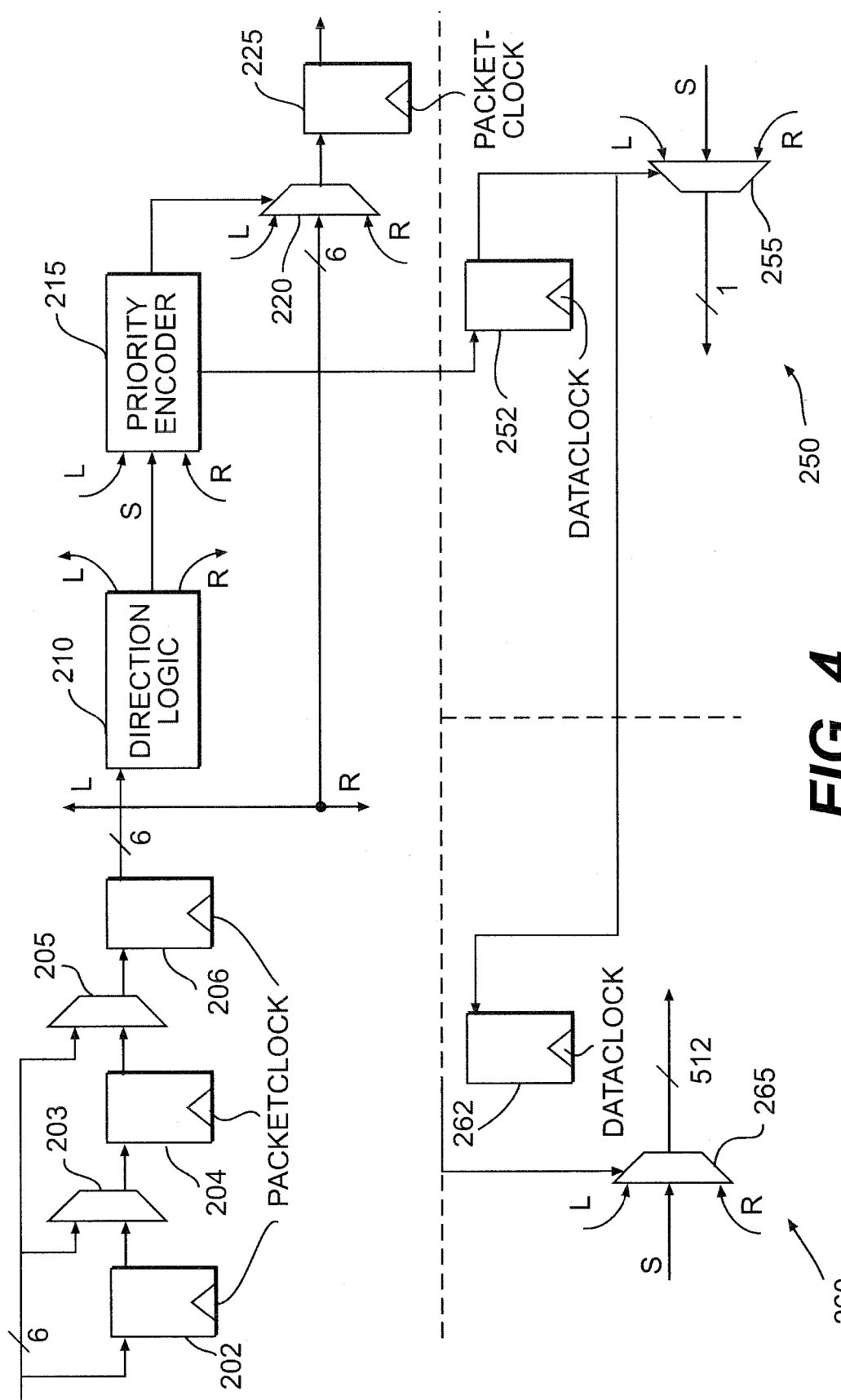
FIG. 4 shows a router of one core in accordance with an example embodiment of the present invention.

FIG. 4 shows a router of one core in accordance with an example embodiment of the present invention. Other embodiments and configurations are also within the scope of the present invention.

More specifically, FIG. 4 shows three pipeline stages of a router, namely a request pipeline stage 200 (or first pipeline stage), an acknowledge pipeline stage 250 (or second pipeline stage) and a transmit pipeline stage 260 (or third pipeline stage). The use of the three pipeline stages may improve throughput over an entirely circuit-switched network while retaining nearly all of energy savings.

As shown in FIG. 4, the request pipeline stage 200 may include flip-flops 202, 204, 206, multiplexers 203, 205, directional logic 210, a priority encoder 215, a flip-flop 220 and a multiplexer 225.

The packet may be received as an input to the flip-flop 202, to one input of the multiplexer 203 and to one input of the multiplexer 205. An output of the flip-flop 202 may be coupled to another input of the multiplexer 203. An output of the multiplexer 203 may be provided to an input of the flip-flop 204. An output of the flip-flop 204 may be provided to another input of the multiplexer 205. An output of the multiplexer 205 may be coupled to an input of flip-flop 206. The flip-flops 202, 204 and 206 may receive a packet clock as select signals.

The flip-flops 202, 204 and 206 and the multiplexers 203 and 205 may serve to buffer received control packets (or received control portions) during a time before a handshake or stop signal can be transmitted back to the transmitter (or source) of these packets indicating that the transmitter (or source) should stop temporarily due to congestion. Because it may take some time for this signal to reach the transmitter (or source) of the control packets (or control portions), some packets may still be received during this time and need to be buffered by these flip-flops. During normal operation, data may go through the multiplexer 205 directly to flip-flop 206 and to the directional logic 210. The number of flip-flop/multiplexer stages may depend on the time it takes the handshaking signal to reach the previous core relative to the rate at which packets are being transmitted.

An output of the flip-flop 206 may be provided to the directional logic 210. The directional logic 210 may compare destination address bits (x and y) of the control portion of the packet to the current core's address in order to determine in which direction the packets should be transmitted. In other words, the directional logic 210 may determine which neighbor core will receive the control data. An output of the directional logic 210 may be provided to the priority encoder 215.

Additionally, input flip-flops 202, 204 and 206 as well as directional logic 210 may be provided at each direction input (north, south, east and west) of the priority encoder 215. The priority encoder 215 may select one of the directions that want to transmit its control packet (or control portion) out to each direction and the direction outputs connect to the corresponding priority encoder inputs of the other three directions.

Each multiplexer 220 may receive its data from the control packet buffering from the other three directions and the select may come from its priority encoder 215. The flip-flops 252 and 262 may store the same multiplexer selects as used from the multiplexer 220. These selects are given to the multiplexers 255 and 265 in successive cycles in order to implement the pipelining.

In FIG. 4, L, R and S refer to left, right and straight as inputs for the multiplexers, where the inputs in the request pipeline stage 200 may be a 6 bit destination address (corresponding to 64 cores), the inputs in the acknowledge pipeline stage 250 may be a single acknowledge bit, and the inputs in the transmit pipeline stage 260 may be a full 512 data portion. The relative direction of the arrows in FIG. 4 may indicate a direction of data flow (from a source at the left to a destination at the right, acknowledge back to the source, and data to the destination). This may be independent of the actual direction of flow on a chip which may change directions at intermediate nodes (using the L, R and S inputs and outputs).

The priority encoder 215 may determine a priority of the data within the router in order to determine an order of transmission or processing. An output of the priority encoder 215 may be provided to the multiplexer 220, and an output of the multiplexer 220 may be provided to the flip-flop 220, which allows the control data to exit the router.

The request pipeline stage 200 may correspond to a first stage that involves traversal of the control portion of the packet from the source to the destination. The request pipeline stage 200 may be considered to use resources of the packet switched network.

The acknowledge pipeline stage 250 relates to the receiving of an acknowledgement signal at a router. As shown in FIG. 4, the acknowledge pipeline stage 250 may include a flip-flop 252 and a multiplexer 255. The acknowledge pipeline stage 250 may operate using a data clock rather than a packet clock as in the request pipeline stage 200. Thus, the acknowledge pipeline stage 250 may be considered to use resources of a circuit switched network.

The acknowledge pipeline stage 250 may correspond to the second stage (or second pipeline stage) that involves traversal of the acknowledgement signal back to the source from the destination to indicate that the data can be sent from the source.

The transmit pipeline stage 260 relates to the sending of the data portion of the packet at the router. The transmit pipeline stage may include flip-flop 262 coupled to a multiplexer 265. The transmit pipeline stage 260 may correspond to the third stage that involves the sending of data to the destination from the source. The transmit pipeline stage 260 may operate using a data clock rather than the packet clock as in the request pipeline stage 200. Thus, the transmit pipeline stage 260 may be considered to use resources of a circuit switched network.

The use of these three pipeline stages may improve the throughput over an entirely circuit-switched network while retaining nearly all of the energy savings. This is because the routing and flow control is hidden from the data transmit pipeline stage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of communicating across a multi-core die, the method comprising:

sending a control portion of a packet from a first core of the multi-core die, through a second core of the multi-core die to a third core of the multi-core die using resources of a packet switched network, the first core being a source on the multi-core die and the third core being a destination on the multi-core die;

sending an acknowledgment signal from the third core of the multi-core die to the first core of the multi-core die in response to the third core receiving the control portion; and sending a data portion of the packet from the first core of the multi-core die through the second core of the multi-core die and to the third core of the multi-core die using resources of a circuit switched network in response to the first core receiving the acknowledgement signal.

2. The method of claim 1, wherein the control portion is sent from the first core of the multi-core die to the second core of the multi-core die using resources of the packet switched network.

3. The method of claim 1, wherein the acknowledgement signal is sent from the third core of the multi-core die through the second core of the multi-core die and to the first core of the multi-core die using resources of the circuit switched network.

4. The method of claim 1, wherein the data portion is sent from the first core of the multi-core die to the second core of the multi-core die using resources of the circuit switched network.

5. The method of claim 1, wherein the control portion contains a destination address.

6. The method of claim 1, wherein sending the control portion from the first core of the multi-core die to the second core of the multi-core die includes sending the control portion along an interconnect of the die between the first core and the second core.

7. The method of claim 6, wherein sending the data portion from the first core of the multi-core die to the second core of the multi-core die includes sending the data portion along the interconnect of the die between the first core and the second core.

8. The method of claim 6, further comprising allocating the interconnect between the first core and the second core for the data portion of the packet in response to the second core receiving the control portion from the first core.

9. The method of claim 1, wherein a link between the first core and the second core is dedicated upon the control portion being received at the second core from the first core.

10. A die comprising:

a first core on the die, a second core on the die and a third core on the die;

a first interconnect between the first core and the second core; and a second interconnect between the second core and the third core, and the first, second and third cores on the die to communicate across the die using resources of a packet switched network when sending a control portion of a packet across the die, and the first, second and third cores on the die to communicate using resources of a circuit switched network when sending a data portion of the packet across the die.

11. The die of claim 10, wherein the first core of the die to send the control portion of the packet through the second core of the die to the third core of the die using the resources of the packet switched network.

12. The die of claim 10, wherein the first interconnect between the first core and the second core is to be allocated for the data portion of the packet in response to the second core receiving the control portion from the first core.

13. The die of claim 10, wherein the third core of the die to send an acknowledgement signal through the second core of the die and to the first core of the die using the resources of the circuit switched network in response to the third core of the die receiving the control portion.

14. The die of claim 13, wherein the first core of the die to send the data portion through the second core of the die and to the third core of the die using the resources of the circuit switched network in response to the first core of the multi-core die receiving the acknowledge signal.

15. The die of claim 10, wherein different clocks are to be used to synchronize resources of the packet switched network and the circuit switched network.

16. The die of claim 10, wherein a link on the die between the first core on the die and the second core on the die is dedicated upon the control portion being received at the second core from the first core.

17. A method of communicating on a multi-core die, the method comprising:

sending a control portion of a packet from a first core of the multi-core die, through a second core of the multi-core die to a third core of the multi-core die using resources of a packet switched network and without simultaneously sending a corresponding data portion of the packet;

sending an acknowledgment from the third core of the multi-core die to the first core of the multi-core die in response to the third core receiving the control portion of the packet; and sending a data portion of the packet from the first core of the multi-core die through the second core of the multi-core die and to the third core of the multi-core die using resources of a circuit switched network in response to the first core of the multi-core die receiving the acknowledgement.

18. The method of claim 17, wherein sending the control portion from the first core to the second core includes sending the control portion along an interconnect of the multi-core die between the first core and the second core.

19. The method of claim 18, further comprising allocating the interconnect between the first core and the second core for the data portion of the packet in response to the second core receiving the control portion from the first core.

20. The method of claim 17, wherein a link on the multi-core die between the first core and the second core is dedicated upon the control portion being received at the second core from the first core.

* * * * *